United States Patent [19]
Boyle et al.

[11] 3,841,914
[45] Oct. 15, 1974

[54] SOLID STATE BATTERY STRUCTURE

[75] Inventors: Gerard H. Boyle, West Concord; James Epstein, Sharon; Charles C. Liang, Andover, all of Mass.

[73] Assignee: P. R. Mallory & Co. Inc., Indianapolis, Ind.

[22] Filed: May 19, 1972

[21] Appl. No.: 254,996

[52] U.S. Cl. .................................. 136/111, 136/14
[51] Int. Cl. ........................................... H01m 21/00
[58] Field of Search ......... 136/6, 83, 108, 111, 166, 136/14

[56] References Cited
UNITED STATES PATENTS

| | | | |
|---|---|---|---|
| 2,816,151 | 12/1957 | Ruben | 136/83 R |
| 2,894,052 | 7/1959 | Evans | 136/83 R |
| 3,023,258 | 2/1962 | Peters | 136/6 GC |
| 3,351,490 | 11/1967 | Von Doehren | 136/6 GC |
| 3,440,105 | 4/1969 | Yamamoto et al. | 136/108 |
| 3,513,027 | 5/1970 | Liang et al. | 136/83 R |
| 3,595,697 | 7/1971 | Dickfeldt et al. | 136/6 G |

*Primary Examiner*—Winston A. Douglas
*Assistant Examiner*—C. F. Lefevour
*Attorney, Agent, or Firm*—Robert Levine

[57] ABSTRACT

A battery consisting of one or several solid state cells held in close surface-to-surface contact by one or more pressure wave springs to hold the cells in tight low-resistance contact throughout the life of the cells, with the springs serving also as end cell electrode contacts, to transmit current to the electrode terminals. Internal parallel connections serve to increase the current delivering capacity of the battery.

6 Claims, 5 Drawing Figures

3,841,914

PATENTED OCT 15 1974

SOLID STATE BATTERY STRUCTURE

DESCRIPTION OF THE INVENTION

This invention relates to solid state battery structures, in which, specifically, the respective components and active ingredients are formed as solid state elements which can be easily and readily handled and assembled to constitute individual cells, and then, if desired, assembled to constitute multi-cell batteries.

The demand for batteries has grown tremendously, especially for use in many general applications of such nature that the battery is to be discarded after use. That demand and type of use has imposed particularly a requirement of economy, without any sacrifice in the quality of the individual cell, or multi-cell battery.

In the evolution of battery design for quality batteries, the electrodes, such as the anode and the cathode, have been formed as solid self-supporting elements, and, additionally, a particularly important development has been the formation of the electrolyte as a solid state self-supporting element, which also serves as a physical barrier or separator element between the two electrodes.

To utilize fully the advantages of the solid state structure of the elements and ingredients of the cell, as now possible, and available for manual handling, a primary object of this invention is to form those respective elements and ingredients as cells that will permit them to be easily and readily and economically assembled, to provide high quality long lasting cells or batteries.

One object of the invention is to stack the discs, of any shape, in appropriate sequential arrangement for electric cell operation, with an assembly procedure that places the elements of a cell under pressure to constitute a unit cell, and then stacks and assembles a plurality of cells to constitute a battery, with the cells under pressure to assure continuous pressure and good electrical contact for the life of the battery.

Another object of this invention is to provide an assembly to hold the cells in operative electrical contact throughout the life of the battery, with resilient compression means in the form of one or more relatively shallow planar wave springs to occupy a minimum of space, and yet to assure the good electrical contact between cells.

It is a further object of the present invention to provide novel and improved high energy solid electrolyte cells and batteries having an extremely long shelf life, with large and continuous outputs of electrical energy for their size, and which may be readily manufactured and sold on a practical and commercial scale at a low cost.

In accordance with the invention, the cathode and the anode with suitable current collectors and the solid state electrolyte are combined as a unit cell, and all components are formed as flat discs with opposite planar surfaces parallel to assure good surface-to-surface contact between the cells, and several unit cells are combined to constitute a battery. To assure minimum resistance between the cells of the battery, throughout the life of the battery, a waveform pressure spring is disposed at one end of the cell stack to rest and react against an inner end surface of a suitable electrically conductive container for the battery, with the upper end of a stack pressed on by a similar waveform pressure spring disposed under a suitable header or closure for the battery.

An important feature of the invention is the utilization of the wave springs at each end of the stack, first, to serve as pressure elements to hold the stack cells tightly in contact, and second, also to serve as end electrical conductors for the cell stack, as conductive elements in the circuit for connecting the battery to an external circuit.

Where several cells are thus assembled in a co-axial stack, a wave formed pressure spring is preferably disposed at each end of the total stack to assure adequate pressure for good electrical contact, and to compensate for any incremental movement, between cells within the stack, as they may become eroded during use of the battery. Series or parallel connections, between individual cells or groups of cells of a total battery stack, are provided by suitable metallic ribbon conductors disposed along and insulated from the periphery of the stack cells, and also disposed radially with respect to appropriate discs to provide the voltages and current capacities desired from the battery.

The manner in which the battery is constructed and assembled, is described in the following specification, taken in connection with the drawings, in which FIG. 1 is a front view, in perspective, of a battery standing vertically, with the front of the container removed to expose the internal elements of the battery;

Figure 1:
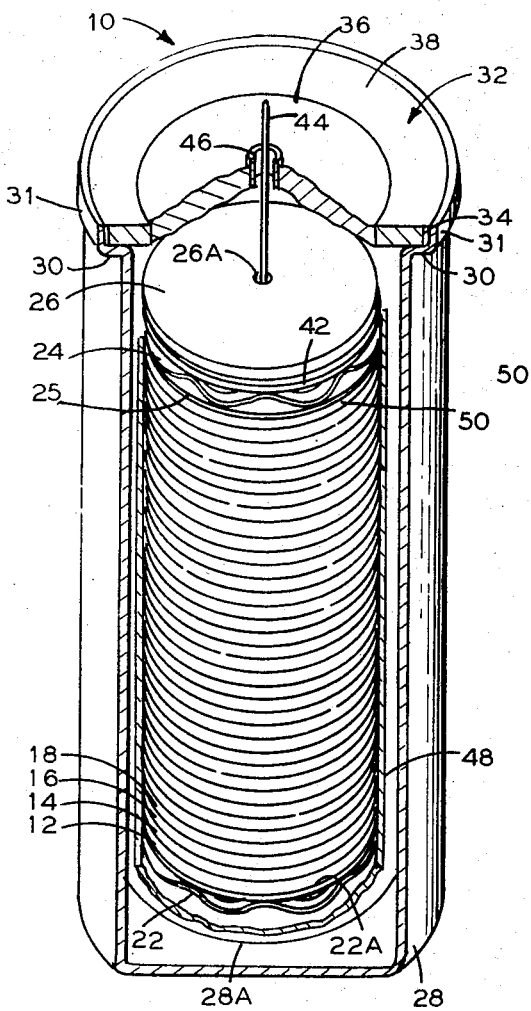

As indicated generally in the drawings, the invention comprises, generally, stacking a set of cells, with wave pressure spring means provided and disposed for compressing the cells to maintain assured circuit continuity of good surface-to-surface contact between adjacent cells, for full effectiveness of the battery throughout the full operating life of the battery. Each cell unit, for the purpose of this description, includes a cathode, an anode and an electrolyte between them. A typical cell unit is shown in U.S. Pat. No. 3,513,027, issued May 19, 1970, and assigned to the common assignee of this application.

As indicated in FIG. 1, a battery 10 is shown as comprising a stack of several cells in series, of which the bottom cell 12 is seated on a pressure washer disc 22A that is seated on an annular wave spring 22, that serves two functions:

1. to maintain axial pressure on the stack cells; and 2. to serve as a current conductor for the end of the stack, and to electrically connect the end of the stack to the conducting metal can 28 that serves as the battery end terminal.

The battery 10 shown in FIG. 1 is a typical battery that may consist of 36 cells, for example, and is shown as including a bottom group of four cells identified by the numerals 12, 14, 16 and 18.

The cells are shown as disposed four to a group, to provide a group voltage of 7.6 volts, and then arranged in series to provide larger voltages; or they may be arranged in parallel for a desired current capacity; or in series and parallel arrangement, as desired.

In the stack, a cathode as the bottom disc element of a cell is positioned to seat directly on the adjacent top surface of the anode disc of the next lower cell, except the cathode of the bottom cell, which rests on the pressure washer disc 22A on the bottom annular wave spring 22.

A second pressure wave spring 24, similar to the bottom wave spring 22, is positioned to seat and press on a protective pressure disc washer 25 on top of the stack of cells. On top of that top wave spring 24 is seated a rigid insulating disc 26 through which pressure is imposed on the wave spring 24, and through that spring 24, onto the stack of cells, during the operation of closing a container can 28 for the battery.

The container can 28, at its open end, embodies an annular seat 30 and a concentric rim edge 31 for receiving and accommodating an annular top header 32 around which the top edge rim of the container can 28 is suitably crimped, or thermally bonded, as by means of a solder, or by electron welding, cold pressure welding, or the like. The header 32 is shown as consisting of a central ceramic or glass disc 36 to which is bonded a circular metallic annular ring 38 by means of which the header is secured to the inner surface to and at the top edge of the closure can 28 for the battery.

The can 28 itself serves as a cathode terminal for the battery, and the electrical connection of the can to the bottom cell is effected through the metallic wave spring 22, which assures good electrical contact in view of the pressure of the spring against the internal surface of the metallic can 28.

When the cells are connected in series, the anode connection for the battery is established through a top metallic disc plate 42, which, in the assembling of the battery, is seated on the top anode disc of the top cell 50, so that a co-axial terminal conductor 44, electrically attached to metallic disc plate 42, will extend through a co-axial opening 46 in the pressure insulating disc 26. Thereby, when the can is sealed with the header pressed down on the insulating disc 26 in an evacuated atmosphere, the air in the battery container 28 will be withdrawn and the header may then be sealed by appropriately soldering the conductive 44 to the metallic lining cylinder in the co-axial opening 46 in the ceramic header 32, after the header has been crimped or soldered, or both, to the top edge of the can 28.

In order to protect the cells against intercell short circuiting, a suitable sleeve 48 of insulating material is disposed within the metallic can 28 to encircle and surround the stack of cell elements throughout the entire length of the stack.

With such construction, all of the discs in the several stacks for the entire battery may be assembled in appropriate position in the open, or in an inert atmosphere, on a work table, or in an automatic selecting and collecting machine in the cylinder of insulating material 48, and then inserted into the metallic container can 28. The entire stack may then be suitably compressed, axially, with the header 32 in place, so that the final operation can be the sealing of the feed-through anode electrode terminal 44 in the header 32.

It will be clear from the description of the structure in FIG. 1 that any number of cells may be arranged in series to provide the voltage desired.

Figure 2:
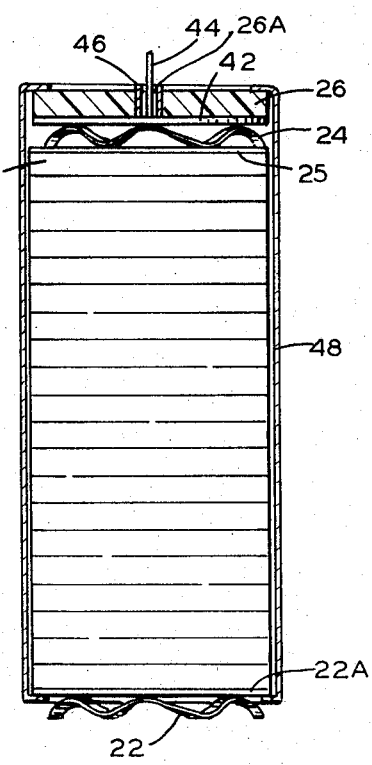
FIG. 2 is a front view, partly in elevation and partly in section of the internal elements of the battery.

As shown in FIG. 2, the elements of the several cells in FIG. 1 are similarly stacked in physical surface-to-surface relation between adjacent discs. The two end discs of the stack are engaged by the two pressure waveform springs 22 and 24, as in FIG. 1, that serve as compressing elements and also as end terminals for the stack. The different number of cells shown is not of significance.

The bottom cell of the stack rests on a thin metallic sheet disc 22A to avoid concentrated point pressure on the bottom disc of cell 12 from the waveform spring 22, that could injure the surface of the disc of cell 12. The top waveform spring 24 rests on a similar metal sheet disc 25 seated on the top cell of the stack. A top metal disc plate 42 rests on the top of the upper waveform spring 24. The axial conductor 44 is physically and electrically connected to the metal disc 42, to serve as the anode terminal connector for the battery. As shown, the terminal 44 extends through an opening 26A in the top pressure insulator 26, and then up through the metal tube 46 in the header 32, shown in FIG. 1. As previously explained, the header 32 is pressed down on the insulating disc 26 to permit the header to be tightly assembled on the top edge of the container can 28 as in FIG. 1. To simplify the showing in FIG. 1, the header 32 on the stack top end is not shown pressed down as it is in actual assembly.

Figure 3:
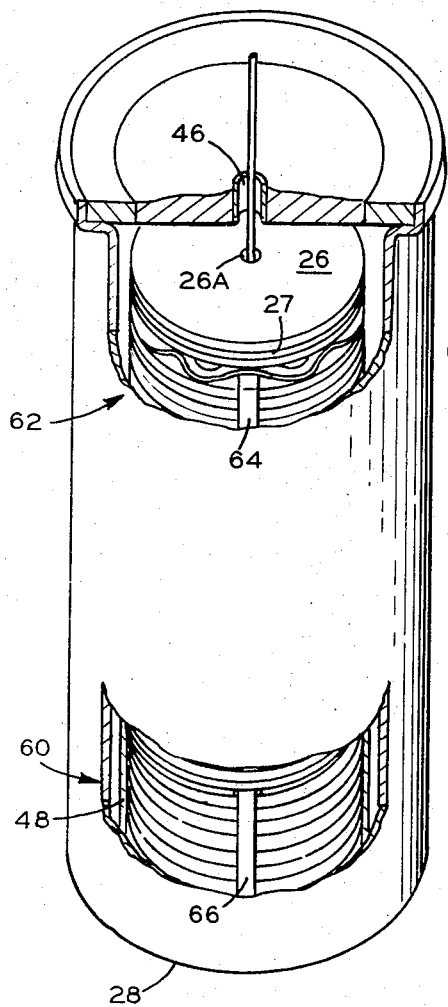
FIG. 3 is a front view, in perspective, with portions of the casing broken away to disclose parts of the internal structure to illustrate intercell connections for parallel arrangement.
Figure 4:
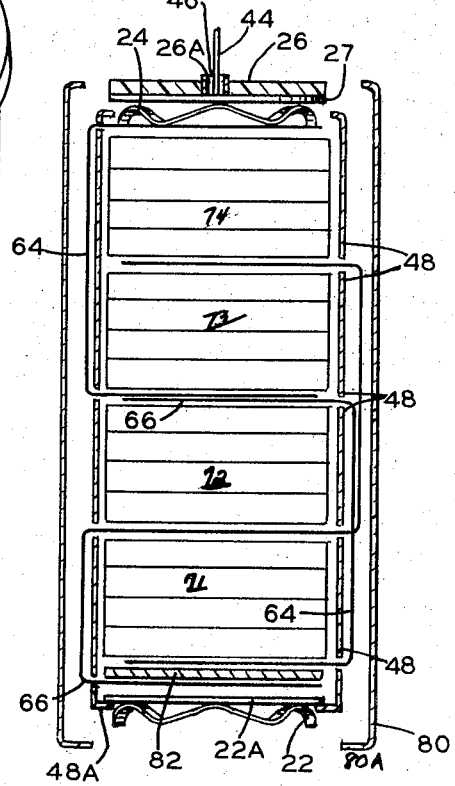
FIG. 4 is a schematic elevational view, partly in section, of the internal cell elements, with paralleling conductors shown for the total battery arrangement.

FIGS. 3 and 4 show a battery in which four stacks of cells are arranged in parallel to provide increased current capacity. FIG. 4 shows that each stack contains four cells.

As shown in FIG. 3, two parts of a container can 28 are cut away to expose two equivalent window regions 60 and 62 to expose a portion of the battery assembly and to show auxiliary conducting metal paralleling strips 64 and 66, between the cells. The strips are disposed along the sides of the cell elements and are insulated from those elements with suitable insulating material such as super-posed encircling polypropylene cylinders not shown in FIG. 3. The cylinders 48 are disposed between the operative elements of the cells and the conducting strips 64 or 66, as is more clearly shown in the arrangement shown in FIG. 4.

As shown in FIG. 4, four cells are provided in each of four parallel stacks including four cells in each stack. The current capacity of the battery is thus four times over that which would be available in a series battery as in FIG. 1, although the voltage is sacrificed since only four cells are available in series in each stack. Thus the voltage is that of four cells in the battery of FIG. 4.

As shown in FIG. 4, the bottom stack 71 is disposed with its positive terminal disc at the bottom and its negative terminal disc at the top. The next stack 72 is disposed in reverse or inverted position. The next stack 73 is disposed with the same polarity arrangement as stack 71, and the next stack 74 is disposed with the same polarity arrangement of stack 72.

In order to provide for internal connections between the four-cell stacks, in FIG. 4, a conducting strip or ribbon 64 engages the positive terminal disc of stack 71 and then proceeds up to disposition between the two positive discs of stacks 72 and 73, and then continues upward to the top positive disc of stack 74, where engagement is also made with the upper waveform spring 24, similar to that in the series type cell and battery in FIGS. 1 and 2. The top surface of the waveform spring 24 is here engaged by the metal plate disc 27, similar to plate 42 in FIG. 2, which has an auxiliary electrode terminal wire 44 extending upward through an insulating pressure disc 26, also similar to that in the battery of FIG. 2. Thus, ribbon strip 64 is the positive bus of the battery.

The negative bus of the battery is a ribbon strip 66 that is electrically connected to the inner floor surface of the conducting container or can 28 through contact with the bottom waveform spring 22 through metal disc 22A.

The two inter-stack connecting strips 64 and 66 are indicated in FIG. 3 through the portions of the can broken away. In order to provide appropriate insulation between these electrically conducting connecting strips and the cell disc elements, and also between these connecting strips and the metal container can, the insulating tubes are employed. In this battery, an inner insulating cylinder or tube 48 is used, as in the series battery of FIG. 1, directly encircling the cell discs, and, in addition a second or outer insulating tube 80 is utilized in this parallel battery, to insulate the metal connecting ribbon strips, 64 and 66 from the metal container can. The insulating tubes may be paper or thin plastic, or the like.

In order to insulate and separate the two inter-stack connecting strips 64 and 66 at the bottom of the stack, an insulating disc 82 is used in this case, and is held within the inner paper tube 48. The waveform spring 22 and its supporting strip are initially positioned to be held in assemblage by the peenedin lower ends 80A of the insulating tube 80, so that the entire cell assembly may be manually handled, during manufacturing, for insertion and assembly within the metal can 28 that serves as the outer container for the battery. After such inner assemblage, consisting substantially of the arrangement shown in FIG. 4, is disposed within the can 28 shown in FIG. 3, the entire stack is suitably compressed against, and pressed inwardly into, the can 28 to provide a pressure disposition of the bottom waveform spring 22 against the bottom inner surface of the can 28 for good electrical conductivity.

Figure 5:
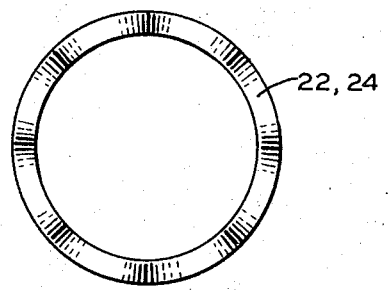
FIG. 5 is a plan view of an annular waveform spring employed in the batteries of the present invention.

A plan view of the waveform springs 22 and 24 is shown in FIG. 5 to illustrate its annular construction, and the many points of physical and electrical contact between the spring and the inner surface of the can 28 or of the sheet or plate engaging either the upper or bottom terminal discs of the stack. The use of these waveform springs, is, of course, an important feature, since with their many points or areas of contact they solved a troublesome problem of maintaining the pressure and low resistance contact on the stacks, so erosion and consequent dimension reduction during use would not affect the operation of the battery. Moreover the axial dimensions are less than with coil springs, which is an important space factor.

As here disclosed, the battery, either in series form or in parallel arrangement of the cell stacks, embodies a plurality of the stacks in which the several elements of the cells are in solid state, so they may be manually handled and assembled, and then manually handled for disposition in the metallic container or can which will serve as one terminal of the battery. The waveform spring employed in the disclosed construction of the battery serves a double purpose in this case. One function is to provide the pressure to hold the respective disc elements in proper physical engagement, to serve as battery components throughout their entire life, and the second function is to serve as conducting terminal elements for the stacks, to provide connections to the can in one instance, and to the electrode terminal in the other instance at the top of the battery.

To simplify the assembling of the discs and the ribbon bus conductors 64 and 66, the inner insulating or paper tube 48 is made in individual short sections.

The invention is not limited to the specific details of construction that are shown but may be variously modified without departing from the spirit and scope of the invention as defined in the claims.

What is claimed is:

1. A solid state battery assembly comprising:
   a plurality of stacks of solid state cells, the cells of each stack connected in series, and the stacks connected in parallel, each cell consisting of anode and cathode components and a solid electrolyte therebetween, all of said component elements being in solid self-supporting state and in flat disc form and disposed in co-axial arrangement;
   a first insulating cylinder encircling said stack of cells to insulate said cell components from inter-stack electrical connectors;
   inter-stack electrical connectors disposed between adjacent terminal discs of the same polarity and extending through and along the wall of said first insulating cylinder such that all of the respective negative terminals of the several cell stacks are connected to one electrode terminal of the battery and all of the respective positive terminals of the several cell stacks are connected to the other electrode terminal of the battery;
   a second insulating cylinder encircling said inter-stack connectors to insulate said connectors from an external container;
   at least one initially stress-energized resilient wave-type spring in annular form disposed at least at one end of the stack to compress the stack of component elements of the battery and to maintain them in operative condition and in electrical connection;

and an outer container to house said assembly, said container comprising a metallic can initially open at its top end and closed at its bottom end, said top end embodying an annular seat and a concentric rim edge, said top end being closed by means of a terminal assembly comprising:
   a metallic disc plate resting upon the uppermost wave-type spring;
   a coaxial insulating disc coextensive with and resting upon said metallic disc plate, said insulating disc having a centrally located coaxial opening;
   an annular top header resting upon said insulating disc and secured to the inner concentric rim edge of said metallic can to thereby seal the battery, said header comprising a central ceramic disc having a centrally disposed coaxial opening and a circular metallic annular ring bonded to the periphery of said ceramic disc, the diameter of said metallic annular ring substantially coextensive with the diameter of the inner rim edge of the metallic can to seat tightly therewithin;

and an axial conductor physically connected to said metallic disc plate and extending through said insulating disc and said central ceramic disc of said header to serve as one terminal for the battery.

2. A solid state battery assembly as in claim 1 in which the annular wave-type spring serves as an electrically conducting and terminal element for said cell stacks for transmitting the polarity potential of the associated cell to an external circuit element.

3. A solid state battery assembly as in claim 2 in which a flat metallic element is disposed between the annular wave-type spring and the adjacent end cell unit to protect the adjoining electrode component of said end cell unit from any sharp edges of said springs.

4. A solid state battery assembly as in claim 1 in which successive cell groups in the stack are disposed in relatively inverted position to place terminal electrode discs of the same polarity in relatively adjacent positions, to simplify the electrical connections for parallel operation.

5. A solid state battery assembly as in claim 1 wherein said annular wave-type spring is electrically conductive and engages an end electrode disc of said cell stack and the bottom end floor of said can.

6. A solid state battery assembly as in claim 1 wherein said inter-stack electrical connectors comprise continuous metallic ribbons.

* * * * *